United States Patent [19]

Bennion et al.

[11] 4,234,667
[45] Nov. 18, 1980

[54] BATTERY AND METHOD FOR FABRICATING SAME

[75] Inventors: Douglas N. Bennion, Bellevue, Wash.; Su-Chee S. Wang, Los Angeles, Calif.

[73] Assignee: The Regents of the University of California, Berkeley, Calif.

[21] Appl. No.: 16,929

[22] Filed: Mar. 2, 1979

[51] Int. Cl.$^3$ .............................................. H01M 6/36
[52] U.S. Cl. .................................... 429/81; 429/112; 429/199
[58] Field of Search ................ 429/81, 103, 112, 199, 429/218, 188, 101, 16

[56] References Cited

U.S. PATENT DOCUMENTS

| | | | |
|---|---|---|---|
| 3,510,357 | 5/1970 | Nielson | 429/112 |
| 3,751,298 | 8/1973 | Senderoff | 429/199 X |
| 4,068,045 | 1/1978 | Abrams | 429/103 X |
| 4,086,396 | 4/1978 | Mathers et al. | 429/103 |
| 4,086,403 | 4/1978 | Whittingham et al. | 429/199 X |
| 4,152,491 | 5/1979 | Chang et al. | 429/112 |

Primary Examiner—Anthony Skapars
Attorney, Agent, or Firm—Herzig & Walsh, Inc.

[57] ABSTRACT

A battery includes a negative electrode comprising metallic lithium (Li) in conjunction with lithium chlorate (LiClO$_3$) electrolyte. Lithium perchlorate (LiClO$_4$) may also be used as the electrolyte. Lithium chloride (LiCl) and lithium oxide (Li$_2$O), individually or together, may also be utilized with lithium chlorate or lithium perchlorate in forming the electrolyte. A positive electrode comprises a metal, such as nickel. In one form, a sheet of lithium metal is sandwiched between two sheets of nickel comprising a negative electrode, one nickel sheet being perforated to permit contact between the lithium sheet and a lithium chlorate electrolyte contained within an insulative member, the other electrode comprising a film of metallic nickel disposed upon the insulative member and in contact with the electrolyte; alternatively, a film or sheet of lithium metal may be disposed upon the insulator as a negative electrode. An additional form includes a ceramic housing comprising a solid ionic conductor and having an interior chamber containing sodium (Na) or lithium as a negative electrode; a liquid electrolyte is disposed within a recess formed by the exterior walls of the housing and a positive electrode in the form of a layer of metallic nickel disposed around the exterior walls of the housing, the electrolyte being in electrical contact with the respective electrodes. A pocket cell form comprises a liquid electrolyte disposed within a recess of a block with the negative electrode inside the recess and the positive electrode in the form of a screen at the mouth of the recess.

28 Claims, 8 Drawing Figures

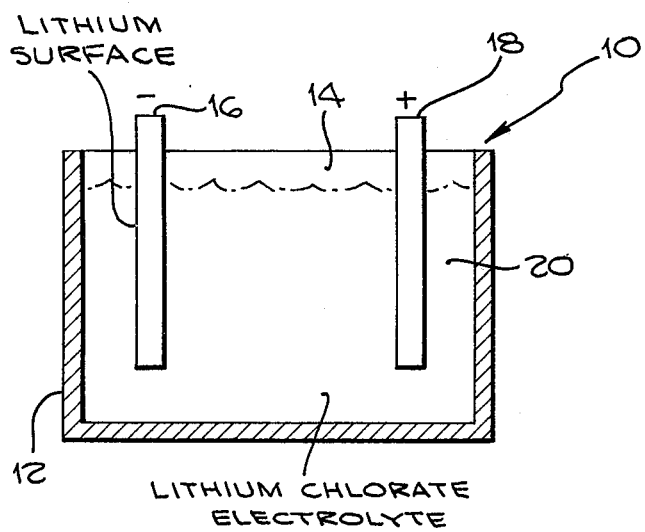
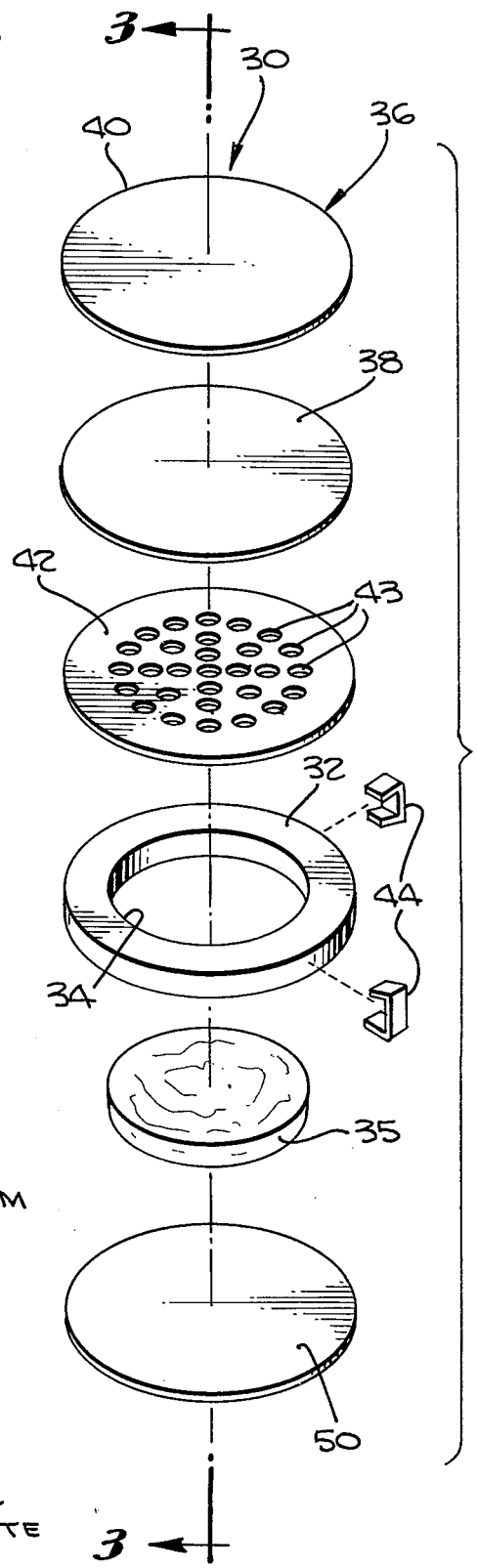
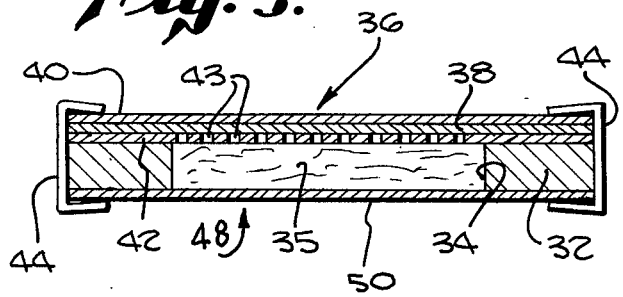
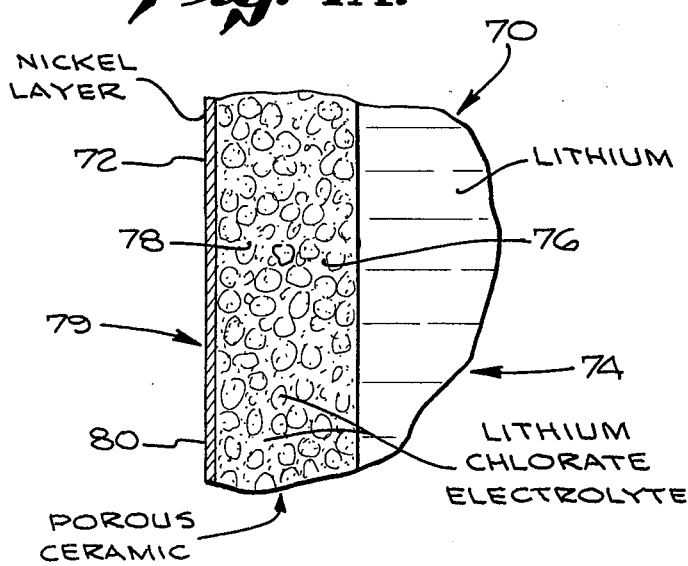

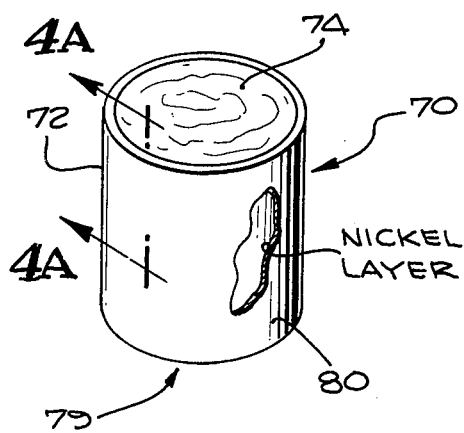
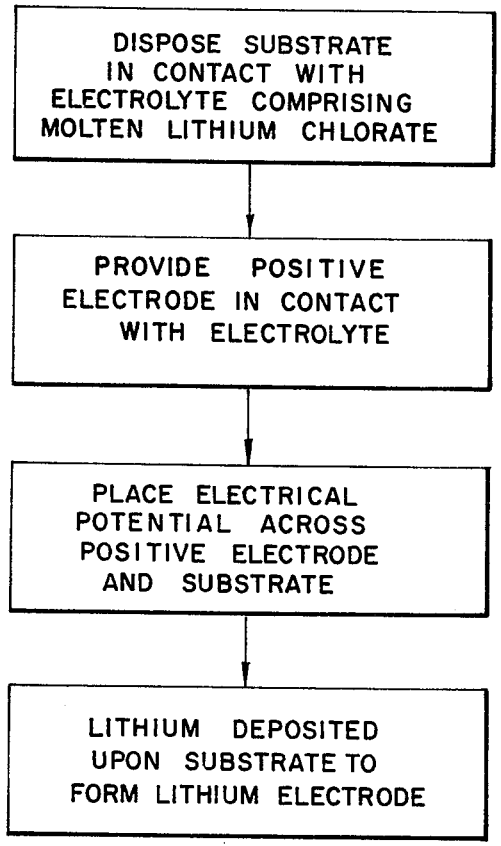
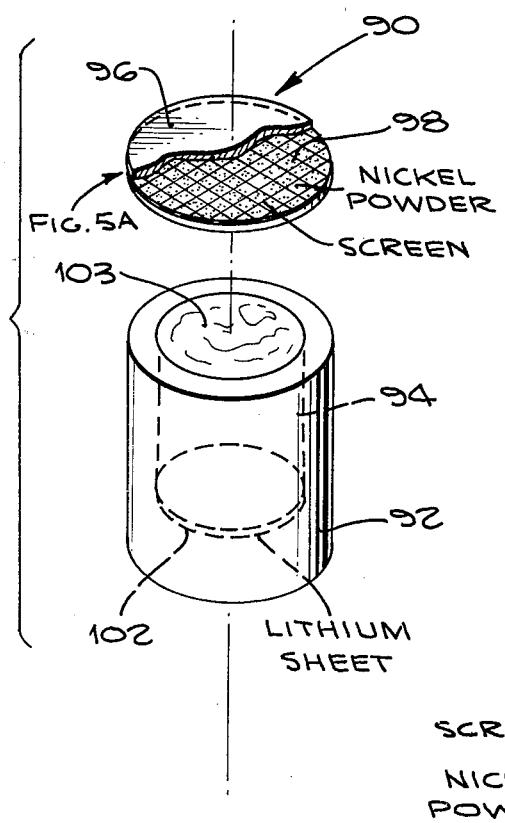
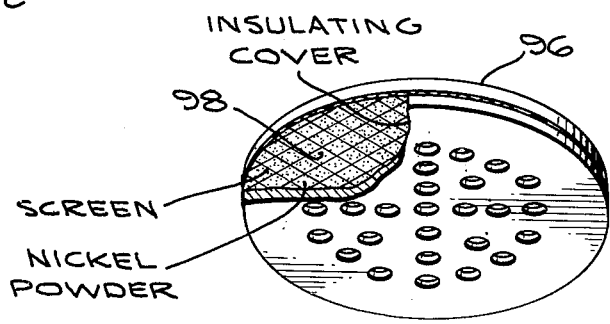

BATTERY AND METHOD FOR FABRICATING SAME

The Government has rights in this invention pursuant to Contract No. NOOON14-75-C-0794 awarded by the Office of Naval Research.

BACKGROUND OF THE INVENTION

1. Field of the Invention

The invention pertains to electrical batteries and methods for fabricating the same.

2. Description of the Prior Art

Many different forms of electrical batteries have been evolved over the years. The standard automobile battery utilizes lead and lead compounds for electrodes and electrolytes to produce electrical power. Due to the present need for more efficient sources of energy and for alternatives to fossil fuels, improved electrical batteries have become the subject of investigation.

In particular, the possibility of use of batteries employing special electrodes has attracted attention. However, existing devices employing such electrodes suffer from certain drawbacks. An example is the eutectic fused salt cell developed by General Motors comprising a lithium-chlorine cell. The cell has experienced numerous materials problems mainly due to the elevated temperatures at which the cell operates, such temperatures being in the area of 450° C. and higher. Other existing cells leave something to be desired in terms of economy or effectiveness.

Thus, there has been a felt but unfulfilled need for an improved electrical battery capable of use in automobiles or other applications.

SUMMARY OF THE INVENTION

An electrical battery comprises a positive electrode, an electrolyte comprising molten lithium chlorate (LiClO$_3$) and a negative electrode comprising elementary lithium in contact with the electrolyte. The electrolyte may also comprise lithium perchlorate (LiClO$_4$) in molten form, either by itself or in a mixture or solution with lithium chlorate. Lithium chloride (LiCl) and lithium oxide (Li$_2$O) may also be utilized, singly or together, in a mixture or solution with lithium chlorate or lithium perchlorate, as electrolytes. The negative electrode may comprise one of the following alloys of lithium: silicon-lithium (Si-Li), lithium-aluminum (Li-Al), and lithium-boron (Li-B).

A battery structure comprises an insulative member defining a recess or disposition therein of an electrolyte, a positive electrode disposed upon the insulative member and in communication with the recess, and a negative electrode including a layer of lithium metal disposed in contact with the insulative member such that the lithium metal layer is in communication with the recess. The negative electrode may include a layer of metallic lithium sandwiched between a first and second layer of metal, one of the layers being disposed upon the insulative member and defining a plurality of perforations to permit access between the recess and the layer of lithium.

A further form of battery in accordance with the invention includes a housing defining a recess, with an electrolyte disposed therein, a positive electrode disposed within the recess and in contact with the electrolyte and a negative electrode comprising a sheet of metallic lithium disposed within the recess and in electrical relationship with the electrolyte. In the foregoing forms of the invention, the electrolyte may comprise any one of the following: lithium perchlorate (LiClO$_4$), lithium chlorate (LiClO$_3$), or a mixture or solution of these salts plus lithium chloride (LiCl), and/or lithium oxide; the electrode may comprise lithium or silicon lithium (Si-Li), lithium-aluminum (Li-Al), or lithium-boron (Li-B).

A method of fabricating a negative electrode comprises the steps of disposing a substrate in contact with an electrolyte of molten lithium chlorate, providing a positive electrode in contact with the electrolyte, placing an electrical potential across the positive electrode and substrate, whereby lithium is deposited upon the substrate to form a lithium electrode.

BRIEF DESCRIPTION OF THE DRAWINGS

FIG. 1 is a diagrammatic rendering of a battery in accordance with the invention;

FIG. 2 is an exploded view, somehwat simplified, of a battery in accordance with the invention;

FIG. 3 is a sectional view, somewhat simplified, of the battery depicted in FIG. 2, the section being taken along the line 3—3.

FIG. 4 is a perspective view, somewhat simplified, of a battery in accordance with the invention, having a somewhat different form from the battery depicted in FIGS. 2 and 3;

FIG. 4A is a fragmentary sectional view of the battery depicted in FIG. 4, the section being along the line 4A—4A;

FIG. 5 is a partially broken away perspective view, somewhat simplified, of a battery in accordance with the invention having a somewhat different form from the batteries depicted in the previous figures;

FIG. 5A is a fragmentary view of a portion of the battery of FIG. 5; and

FIG. 6 comprises a schematic diagram of a method for fabricating an electrode for a battery in accordance with the invention.

DETAILED DESCRIPTION OF THE INVENTION

As depicted in FIG. 1, a battery 10 includes an insulative container 12, which defines a battery chamber 14. Chamber 14 includes a negative electrode 16 and a positive electrode 18 attached to the interior wall of container 12. Electrodes 16, 18 are spatially separated from one another and are in electrical relationship with one another through an electrolyte 20, contained within chamber 14.

Electrode 16 may be of conventional configuration, such as the grid normally found in storage batteries. The electrode 16 has an outer surface of elemental lithium, preferably disposed over a substrate of aluminum or, alternatively, nickel. Electrode 16 is in contact with electrolyte 20 and exchanges ions and electrons therewith.

Electrode 18, like electrode 16, may have a conventional configuration and comprises an elemental metal, such as nickel. The electrode 18 is in electrical contact with the electrolyte 20.

Electrolyte 20 comprises molten lithium chlorate (LiClO$_3$). The lithium chlorate is within a temperature range of substantially 140° C.-160° C. Electrolytes comprising lithium perchlorate (LiClO$_4$) may also be employed in accordance with the invention. Electrolytes composed of mixtures or solutions of lithium perchlorate and/or lithium chlorate, on the one hand, and lithium chloride (LiCl) and/or lithium oxide (Li$_2$O), on the other hand, may also be employed in accordance with the invention. A diluent of magnesium dioxide (MgO$_2$), which is inert, may be employed to prevent movement of the electrolyte to the surface. The diluent absorbs heat as well as preventing the rate of confluence of the electrolyte to become excessive and can be thus employed to control, in effect, the reaction rate. LiClO$_3$ and LiClO$_4$ may be dissolved in one another in virtually any proportions; the combined concentrations of the LiCl and Li$_2$O in the electrolyte may be as high as 50 percent (50%) by volume.

In particular applications, where a slow, highly controlled reaction is desired, an alloy of lithium may be employed as the negative electrode; such alloys include Si-Li (silicon-lithium), Li-Al (lithium-aluminum), and Li-B (lithium-boron).

Batteries in accordance with the invention as depicted in FIG. 1 will discharge and provide a seat of emf. Batteries in accordance with the invention are rechargeable, i.e., the chemical reaction through which the battery becomes a seat of emf, the discharge reaction, is reversible chemically through the application of an electrical current which recharges the battery. In a typical process, electrical potential is applied across the battery which causes lithium to be deposited upon the negative electrode from the lithium chlorate electrolyte. The battery then is in condition to be discharged once again. Thus, batteries in accordance with the invention constitute primary, as well as secondary, batteries. Because the discharge reaction takes place at temperatures in the range of 140°–160° C., batteries in accordance with the invention may be stored for lengthy periods at room temperature without suffering appreciable loss of effectiveness. The operating temperature may vary slightly primarily with respect to the proportions of LiClO$_3$ and LiClO$_4$ in the electrolyte.

In addition to compounds of chlorine, the electrolyte may be compounded of other halides, such as compounds of fluorine and bromine.

As depicted in FIGS. 2 and 3, a battery 30 in accordance with the invention includes an insulative member 32. Insulative member 32 defines a recess 34. In recess 34 is disposed a quantity of electrolyte 35 comprising lithium chlorate in molten form, or the alternative forms of electrolyte referred to hereinabove. As depicted, the insulative member 32 is in the form of a washer, though, of course, other configurations may be employed in accordance with the invention. On one side of the insulative member 32 is disposed a negative electrode 36. The latter comprises a thin sheet of lithium metal 38 sandwiched between sheets 40, 42 composed of a metal, such as nickel. Sheet 42 is disposed in contact with the insulative member 32 and contains perforations 43 giving access between the lithium sheet 38 and the electrolyte 35. The negative electrode 36 is affixed to the insulative member 32 by means of a pair of clamps 44 composed of electrically insulative material. At the opposite side of the insulative member 32 is affixed a positive electrode 48 in the form of a thin sheet or film 50 of metal, such as nickel. The sheet 50 is affixed to the insulative member 32 by clamps 44. The electrolyte 35 is in contact with the sheet 50, and with lithium sheet 38 through perforations 43.

Alternatively, a sheet of lithium metal may be affixed independently of any surrounding material, to the insulative member and in electrical contact with the charge of electrolyte, to form the battery. The battery 30 has both primary and secondary capabilities as was described hereinabove in connection with the description relative to FIG. 1. Thus, a compact and highly effective battery is provided in accordance with the invention.

As depicted in FIGS. 4, 4A, battery 70 includes a housing 72 which, as depicted, is cylindrical in form. The housing 72 is composed of a cation conductive ceramic, such as beta alumina, which constitutes a solid ionic conductor. A negative electrode 74 comprises molten elementary lithium or sodium contained within the housing 72. An electrolyte 76 comprising molten lithium chlorate, or other lithium compounds a set forth hereinabove, is disposed in a layer around the ceramic housing 72 in a gap 78 defined by the exterior of housing 72 and interior of a positive electrode 79 comprising a layer 80 of a metal, such as nickel, disposed around the exterior of the housing 72. The layer 80 is in electrical contact with the electrolyte of lithium chlorate due to the conductive property of the ceramic of which housing 72 is composed. Thus, a battery with a negative electrode comprising the molten contents in the housing and with a positive electrode comprising the layer 80, together with a lithium based electrolyte 76, is provided and has the characteristics and capabilities described hereinabove in conjunction with the the discussion with respect to FIG. 1.

As depicted in FIGS. 5, 5A, pocket cell battery 90 includes a surrounding structure 92 in the form of a solid block of metal, such as stainless steel. The block 92 defines a recess or pocket 94 (depicted in dotted lines). A positive electrode 96 comprises a nickel screen 98 with carbonyl nickel powder sintered onto it to form a porous structure. The positive electrode 96 is wrapped in a glass cloth (not shown) or in other insulative and flexible material, and is disposed in the slot 94 and affixed to the walls thereof by conventional means, such as epoxy adhesives. A negative electrode comprises a lithium metal sheet 102 disposed against an inner wall of slot 94. The slot 94 further contains an electrolyte 103 comprising molten lithium chlorate, or other lithium compound as described herein, in electrical contact with the lithium sheet 102 and the positive electrode 96. The cell operates in the same fashion as that depicted and described in connection with FIG. 1.

As depicted in FIG. 6, a method of fabricating a lithium electrode includes the step of disposing a substrate, such as nickel, in electrical contact with an electrolyte comprising molten lithium chlorate, or other lithium compounds described above. The method further includes the step of providing a positive electrode in electrical contact with the electrolyte. An electrical potential is then placed across the combination such that the substrate reacts with the lithium chlorate solution whereby elementary lithium is deposited upon the substrate. The reaction takes place in the temperature range of 140°–160° C., though it may take place at higher temperatures as well. A lithium electrode comprising a film of elementary lithium upon a substrate is thus formed and may be utilized in batteries in accordance with the invention, as described and depicted hereinabove.

Though specific embodiments of the invention are described and depicted hereinabove, the invention is defined solely by the appended claims interpreted in light of the specification and drawings.

What is claimed is:

1. An electrical battery comprising:

a positive electrode;

an electrolyte comprising molten lithium chlorate or lithium perchlorate; and a negative electrode comprising elementary lithium in contact with said electrolyte.

2. The invention as set forth in claim 1 wherein said electrolyte comprises a mixture of lithium chlorate and magnesium dioxide.

3. The invention as set forth in claim 1 wherein there is mixed with said electrolyte, lithium chloride or lithium oxide in molten form.

4. An electrical battery comprising:

a positive electrode;

an electrolyte in contact with said positive electrode and with a negative electrode, said electrolyte being in molten form, and consists of lithium chlorate as lithium perchlorate; and a negative electrode in contact with said electrolyte and being silicon-lithium, lithium-aluminum, or lithium-boron.

5. The invention as set forth in claim 4 wherein said electrolyte is mixed with magnesium oxide ($Mg_2O$).

6. The invention as set forth in claim 4 wherein said negative electrode comprises a thin layer of one of said alloys disposed upon a metallic substrate.

7. The invention as set forth in claim 4 wherein said electrolyte is mixed with lithium chloride or lithium oxide.

8. In an electric battery comprising a negative electrode, a positive electrode, and an electrolyte in electrical relationship with said positive electrode and negative electrode, the improvement comprising a negative electrode composed of metallic lithium and an electrolyte composed of molten lithium chlorate.

9. In an electric battery comprising a negative electrode, a positive electrode, and an electrolyte in electrical relationship with the negative electrode and the positive electrode, the improvement comprising:

a negative electrode composed of one of the following: elementary lithium, silicon-lithium alloy, lithium-aluminum alloy and lithium-boron alloy, and an electrolyte comprising one of the following in molten form: lithium perchlorate and lithium chlorate, the electrolyte being in electrical relationship with said negative electrode and said positive electrode.

10. The invention as set forth in claim 9 wherein said electrolyte comprises a mixture of lithium chlorate and lithium perchlorate.

11. The invention as set forth in claim 9 wherein said electrolyte is mixed with lithium chloride or lithium oxide.

12. The invention as set forth in claim 9 wherein magnesium dioxide is mixed with said electrolyte.

13. An electrical battery comprising:

an insulative member, said insulative member defining a recess for disposition therein of an electrolyte;

a positive electrode disposed upon said insulative member and in communication with said recess;

a negative electrode including a layer of lithium metal, the negative electrode being disposed in contact with the insulative member such that said lithium metal layer is in communication with said recess; and an electrolyte in molten form, said electrolyte being lithium chlorate or lithium perchlorate, said electrolyte being disposed within said recess and in electrical relationship with said negative electrode and said positive electrode.

14. An electrical battery comprising:

an insulative member, said insulative member defining a recess for disposition therein of an electrolyte;

a positive electrode disposed upon said insulative member and in communication with said recess;

a negative electrode including a layer of metallic lithium disposed between a first and second layer of metal, said second layer being disposed upon said insulative member and defining a plurality of perforations to permit access between said recess and said layer of lithium; and an electrolyte in molten form, said electrolyte being lithium chlorate or lithium perchlorate, said electrolyte being disposed within said recess and in electrical relationship with said negative electrode and said positive electrode.

15. The invention as set forth in claim 13 or claim 14 wherein said electrolyte in molten form being lithium perchlorate or lithium chlorate is mixed with lithium chloride or lithium oxide.

16. The invention as set forth in claim 13 or claim 14 wherein said positive electrode comprises a layer of metallic nickel.

17. An electrical battery comprising:

an insulative member, said insulative member defining a recess for disposition therein of an electrolyte;

a positive electrode disposed upon said insulative member and in communication with said recess;

a negative electrode including a layer of one of the following alloys of lithium: silicon-lithium, lithium-aluminum, and lithium-boron; and an electrolyte in molten form, said electrolyte being lithium perchlorate or lithium chlorate disposed within said recess in said insulative member and in electrical relationship with said negative electrode and said positive electrode.

18. An electrical battery comprising:

an insulative member, said insulative member defining a recess for disposition therein of an electrolyte;

a positive electrode disposed upon said insulative member and in communication with said recess;

a negative electrode including a layer of one of the following alloys of lithium: silicon-lithium, lithium-aluminum, and lithium-boron, disposed between a first and a second layer of metal, said second layer being disposed upon said insulative member and defining a plurality of perforations to permit access between said recess and said layer disposed between said first and second layers of metal; and an electrolyte in molten form, said electrolyte being lithium perchlorate or lithium chlorate disposed within said recess in said insulative member and in electrical relationship with said negative electrode and said positive electrode.

19. The invention as set forth in either claim 17 or claim 18 wherein said electrolyte in molten form being lithium perchlorate or lithium chlorate is mixed with lithium chloride or lithium oxide.

20. A battery comprising:

a housing comprising a solid ionic conductor;

a negative electrode contained within said housing comprising said negative electrode being in molten form and being lithium or sodium;

a positive electrode disposed around the outer surface of said housing and forming with the exterior of said housing, a recess for disposition of electrolyte therein; and an electrolyte in molten form, said electrolyte being lithium perchlorate or lithium chlorate, said electrolyte being disposed within said recess and in electrical contact with said negative electrode and with said positive electrode.

21. The invention as set forth in claim 20 wherein said positive electrode comprises a thin film of metallic nickel.

22. The invention as set forth in claim 20 wherein said housing is composed of beta alumina material.

23. The invention as set forth in claim 20 wherein said electrolyte is mixed with lithium chloride or lithium oxide.

24. An electrical battery comprising:
a housing defining a recess;
an electrolyte disposed within said recess, said electrolyte being in molten form, said electrolyte being lithium perchlorate or lithium chlorate disposed within said recess;
a negative electrode comprising a sheet of metallic lithium disposed within said recess and in electrical relationship with said electrolyte; and
a positive electrode disposed within said recess and in contact with said electrolyte.

25. The invention as set forth in claim 24 wherein said positive electrode comprises a screen member with a powder of metallic nickel sintered upon it.

26. The invention as set forth in claim 24 wherein said electrolyte is mixed with lithium chloride or lithium oxide in molten form.

27. An electrical battery comprising:
an insulative member having a recess for disposition therein of an electrolyte;
a positive electrode disposed upon said insulative member and in communication with said recess;
a negative electrode including a layer of lithium metal, the negative electrode being disposed in contact with the insulative member such that said lithium metal layer is in communication with said recess; and
an electrolyte composed of molten lithium chlorate disposed within said recess in said insulative member and in electrical relationship with said negative electrode and said positive electrode.

28. The invention as set forth in claim 27 wherein said negative electrode further includes a first and second layer of metal, said layer of metallic lithium being disposed between said first layer of metal and said second layer of metal, the latter being disposed upon said insulative member and defining a plurality of perforations to permit access between said recess and said layer of lithium.

* * * * *